Jan. 5, 1932.  D. K. McILVAINE  1,839,797
PRINTING ELECTRIC METER
Filed Dec. 17, 1930   5 Sheets-Sheet 1

Jan. 5, 1932.    D. K. McILVAINE    1,839,797
PRINTING ELECTRIC METER
Filed Dec. 17, 1930    5 Sheets-Sheet 2

Inventor
D. K. McIlvaine,
By
Attorney

INVENTOR
D. K. McIlvaine,

Jan. 5, 1932.  D. K. McILVAINE  1,839,797
PRINTING ELECTRIC METER
Filed Dec. 17, 1930   5 Sheets-Sheet 4
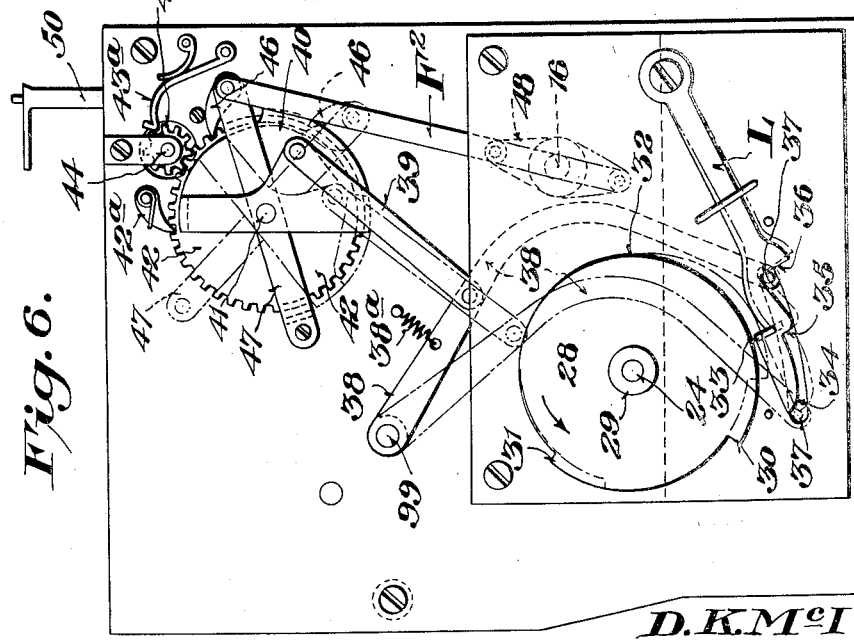

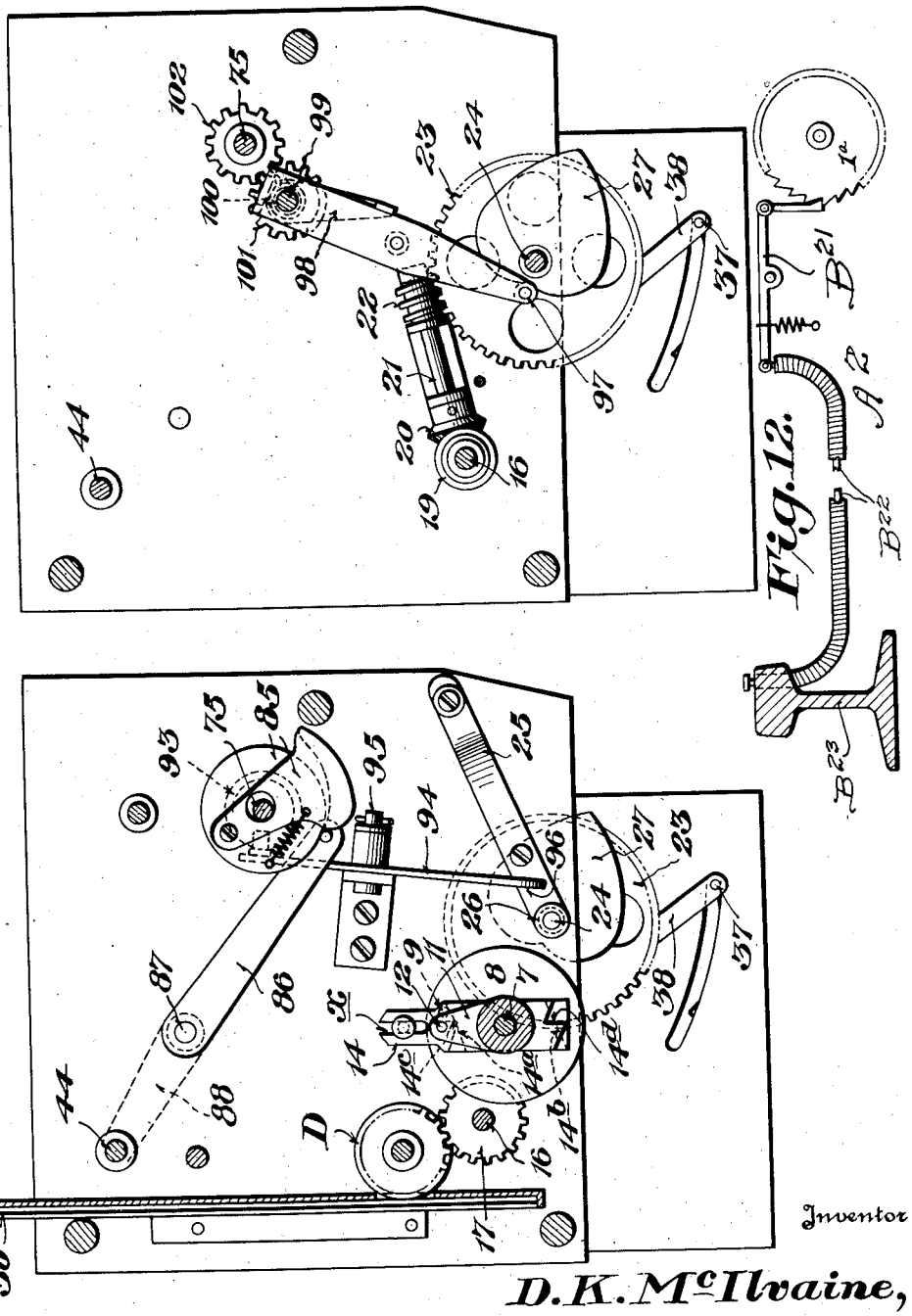

Patented Jan. 5, 1932

1,839,797

UNITED STATES PATENT OFFICE

DOUGLAS KINDER McILVAINE, OF CONNELLSVILLE, PENNSYLVANIA

PRINTING ELECTRIC METER

Application filed December 17, 1930. Serial No. 503,032.

This invention relates to metering or measuring devices, and more particularly to a meter for measuring electrical energy used by a consumer, and having means for making a printed record of the amount of such energy used and to be paid for over a specified period of time.

Electric energy is usually sold to consumers on the basis of a differential rate or scale or what is commonly referred to as the "block step" rate. That is to say, for the first unit of kilowatts consumed the user pays a certain rate, and after this period of consumption has taken place a lower rate is put into effect, and then if desired a still lower rate may be effected.

Accordingly, a primary object of the invention is to provide a construction for calculating and printing the consumer's bill according to a plurality of different monetary rates for the consumption of electrical energy in kilowatts, the rate changing as additional kilowatts are used. While the invention is particularly adaptable to meters for measuring electrical energy, nevertheless, the principles and novel features of certain of the units of construction are adaptable to meters for automatically calculating, recording and rendering bills or their equivalent in coded form from electric, gas and water meters, and counters of units, or blocks of units of any commodity the unit value of which decreases in monetary value with increased quantity of use.

A further object of the invention is to provide a novel rate changing and calculating unit which will accurately and reliably function and avoid the possibility of mistakes due to persons making erroneous calculations, false meter readings, transcriptions of figures and malicious intent by unauthorized persons.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a diagrammatic view illustrating the essential elements of the invention.

Figure 1ª is a diagrammatic view illustrating one means for obtaining an intermittent current from a source of constant current.

Figure 6 is a side elevation of one end of the device.

Figure 7 is a side elevational of the opposite end of the device shown in Figure 6, the end wall being partly broken away to better illustrate the printing instrumentalities.

Figure 8 is a vertical sectional view taken on the line 8—8 of Figure 4.

Figure 9 is a vertical sectional view taken on the line 9—9 of Figure 4.

Figure 12 is a detail view illustrating the range of modification in the form of actuating means that may be employed.

Similar reference characters designate corresponding parts throughout the several figures of the drawings.

Figure 1:
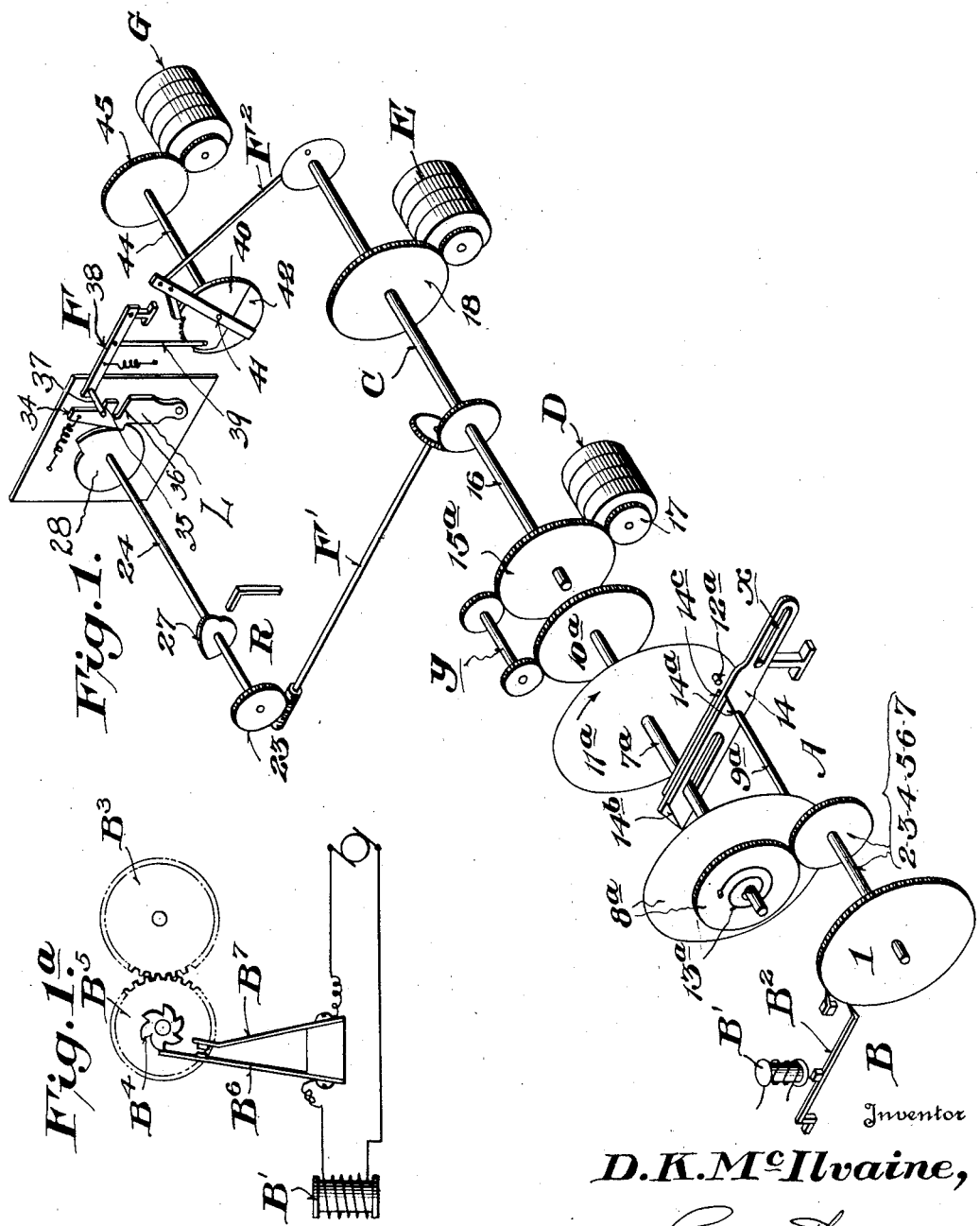
Figure 2:
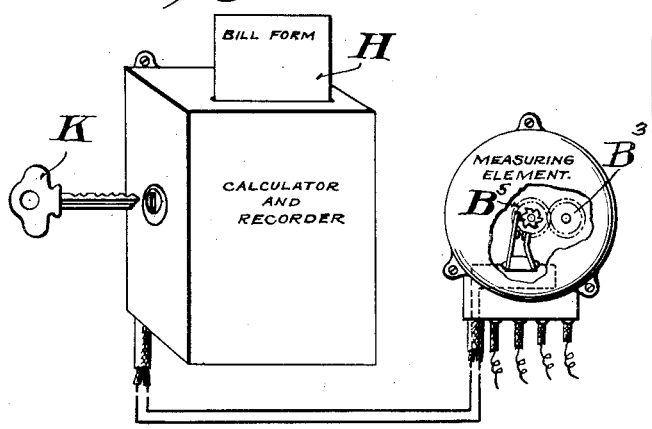
Figure 2 is a detail perspective view of the complete unit showing its relation to a measuring element.

The present invention is a continuation in part of my former application, Serial No. 399,043, filed October 11, 1929 for an improvement in calculating and recording devices, and Figure 1 of the present case is a duplicate of Figure 1 in that application.

Referring to the drawings, it will be observed from Figure 1 that the device includes in its organization, actuating means designated generally as A and including suitable gearing and the like to be hereinafter more fully described, together with a prime mover consisting of an electrical impulse responsive device B. The said device B comprises an electromagnet B' and an armature B² which serves as an actuating pawl under the influence of the periodic energization of the magnet B' through the medium of any well known electrical devices for changing constant current to intermittent current. For example, there is shown in Figure 1ᵃ a device which may be used for changing constant current to intermittent current in the case of an electric meter. In this figure, the usual meter wheel is designated as B³, the same being geared or otherwise operatively connected with a wheel or pinion B⁵ which may operate a cam or the like B⁴ which in turn opens and closes the contact arms B⁶ and B⁷ included in the electrical circuit which also has the electro-magnet B' included therein. It is to be understood, however, that the means shown in Figure 1ᵃ is merely illustrative of one form of apparatus that may be employed for constituting a prime mover for the actuating means A.

Referring again to the actuating means A it is pointed out that the same is intended to operate a main shaft designated generally as C which in turn operates a total units printing counter D, a monthly or other pay period units counter E, and also operates the variable rate calculating printing unit F through the medium of the shaft F' and the link F². This variable rate calculating unit is connected with a cash or charge printing unit which prints the net charge on the bill form H to correspond with the number of units of the commodity consumed or used within the specified pay period.

Figure 10:
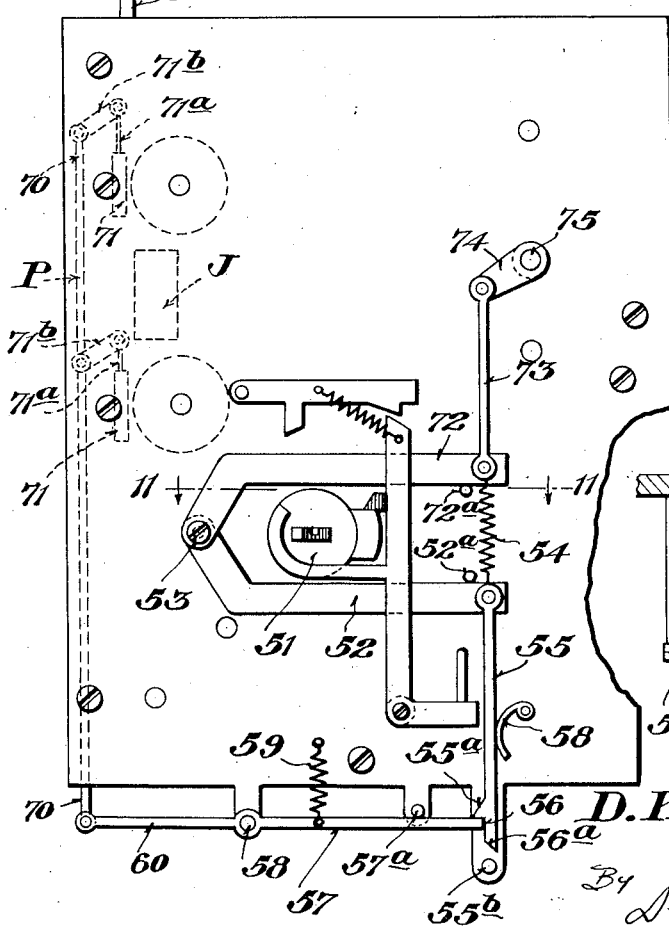
Figure 10 is a view illustrating the key operated means for actuating the printing instrumentalities and resetting the members.
Figure 11:
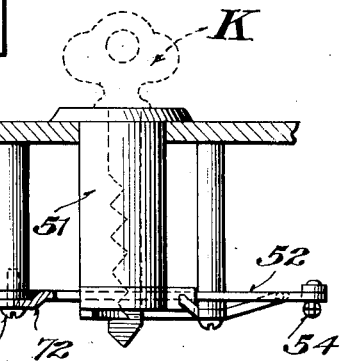
Figure 11 is a detail view of the key barrel and its associated parts.
Figure 4:
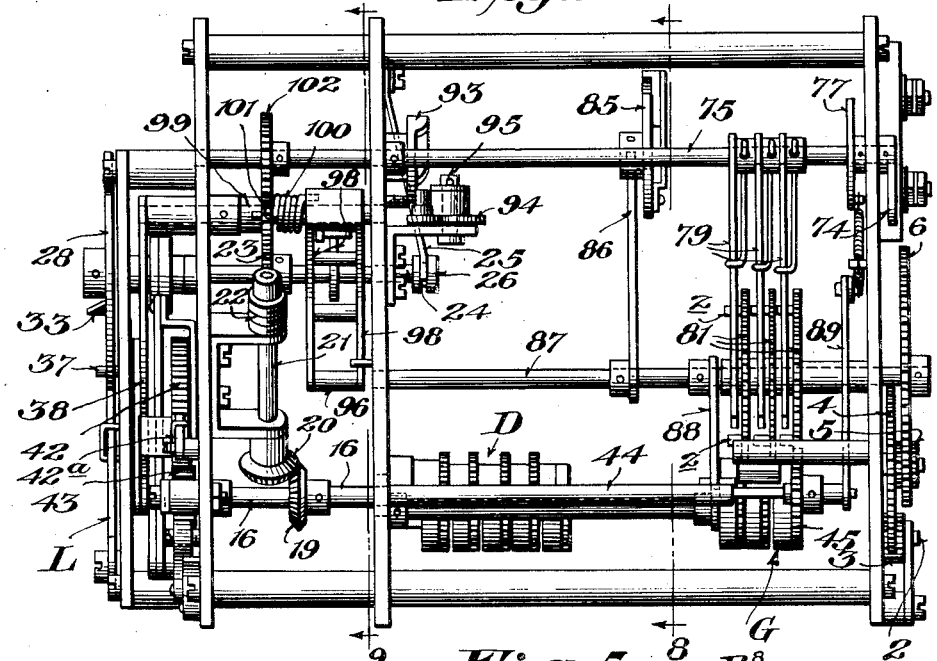
Figure 4 is a top plan view of the construction involved with the casing removed.

Suitable printing means designated generally as P (Figure 10) is provided for taking a record from the counters or dials of the units D, E and G, the said printing means being actuated by the key K, Figure 11. This key is also utilized for operating the resetting means designated generally as R and which is intended to reset the monthly or other period units counter E, the variable rate calculating unit F, and the cash or charge printing unit G. It will, therefore, be apparent that after all of the automatic functions of the present recording device have been performed, an attendant may insert the key K at the proper place and likewise insert the bill form H in the device to take a printed record of the condition of the device and then reset the mechanism for further use.

One of the distinctive features of the invention resides in the novel construction, arrangement and operation of the variable rate calculating unit F and this will be described more in detail later. However, taking up the various units in sequence, the actuating means A will first be described.

*Actuating means*

The object of the actuating means A is, as previously indicated, to operate the main shaft C or its equivalent periodically one full revolution for each half-revolution of the motion imparting gear of the actuating means. Some of the objects in having the shaft C operate periodically in full revolutions is to cause the movements of the type wheels of the total units counter D to always assume proper alinement, and also to impart a similar movement to the type wheels of the unit E while at the same time causing the link F² to have a uniform stroke at each operation. It is essential to provide a uniform stroke of movement for the link F² since, as will hereinafter more fully appear, this link operates in conjunction with a predetermined number of teeth on a ratchet wheel to operate the charge printing unit G a maximum rate, and then when certain of these predetermined number of teeth are rendered inoperative for the same stroke or movement of the link F², the rate of charge will be decreased in accordance with the object of the invention heretofore outlined.

The actuating means A, therefore, may include various elements for carrying into effect the foregoing objects, and by way of describing the form of actuating means actually embodied in a complete device, reference will first be made to the actuating means shown perhaps more clearly in Figures 4, 5, 7 and 8, and then reference will be later made to the equivalent actuating means A shown in Figure 1.

Referring to Figure 7, it will be observed that the electro-magnet B' is mounted in a suitable framework and has the armature B² which operates the pawl B⁸. As the pawl B⁸ is reciprocated, motion is imparted to the ratchet gear 1, shaft 2, and gearing 3, 4, 5, 6 to the shaft 7.

The shaft 7 (Figure 8) carries therewith a detent actuating disk 8 having a laterally offset pin 9. Therefore, it will be apparent that the shaft 7 and disk 8 rotate more or less steadily under the influence of the actuating pawl B⁸.

The shaft 7 (Figure 5) has loosely mounted thereon a gear 10 provided with a hub having a radially disposed arm 11 or its equivalent carrying an offset lug 12, the said gear 10 being connected with the shaft 7 by a coil spring 13. As will be seen from Figures 5 and 8 for example, a detent 14 having a slot x is slidably mounted over the shaft 7 and is suitably guided at its upper end as indicated at x so that it will move up or down when one of the other of the inclines 14ᵃ or 14ᵇ is engaged by the lug 9 of the positively driven disk 8. The side of the slidable detent 14 opposite that having the inclined faces 14ᵃ and 14ᵇ is provided with the reversely related stop shoulders 14ᶜ and 14ᵈ for engaging and holding the lug 12 except when the detent is shifted to release the lug as will now be explained.

Normally, the lug 12 is engaged behind either the shoulders 14ᶜ or 14ᵈ due to the shaft 7 having placed spring 13 under tension, it of course being remembered that the spring 13 is connected with shaft 7 and with gear 10, the latter being loose on the shaft. As shaft 7 moves continuously, disk 8 and pin 9 move steadily and at each half-revolution the pin 9 shifts detent 14 to release the lug 12 whereby gear 10 makes one half-revolution, that is from shoulder 14ᶜ to shoulder 14ᵈ for example.

Figure 5:
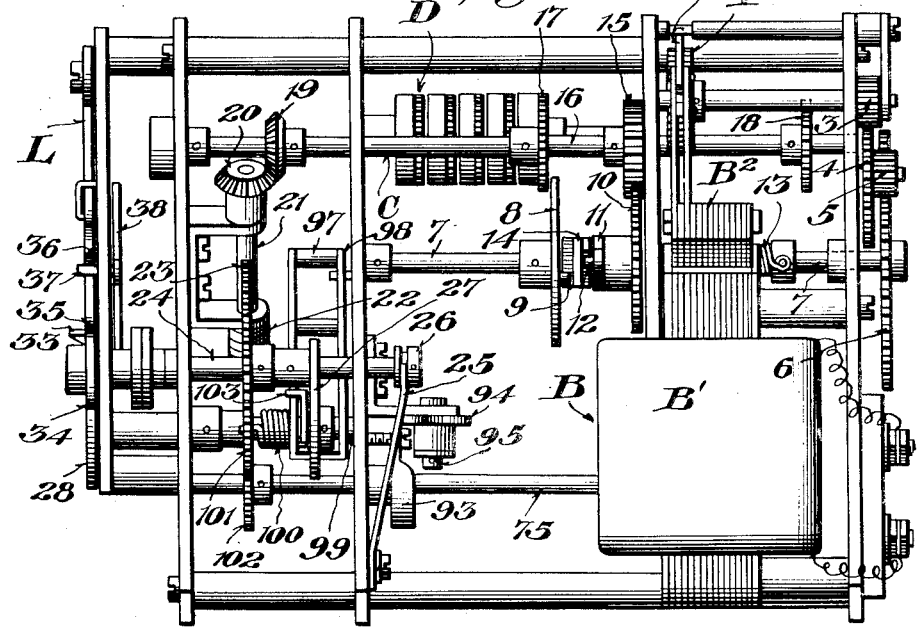
Figure 5 is a bottom plan view of the construction shown in Figure 4.

As will be observed from Figure 5, the gear 10 meshes with a smaller gear 15 on the shaft 16 which latter may be termed the main shaft heretofore designated as C, the ratio of gear 10 to gear 15 being "2 to 1" so that for each half-revolution of the gear 10, the gear 15 and main shaft C make a full revolution. The diagram, Figure 1, shows an equivalent construction wherein the disk 8ª and the attached gear are loosely mounted on shaft 7ª but are connected by the spring 13ª. As the disk and combined gear 8ª are turned, the spring 13ª is wound up, and since shaft 7ª is held or detained by the detent 14, the winding up of the spring 13ª will continue until the detent 14 releases the shaft 7ª which carries therewith the disk 11ª having the pin 12ª for engaging with the detent 14. The disk 11ª is fast on the shaft 7ª, and together with the lug 12ª is the full equivalent of the arm 11 and lug 12 in Figures 5 and 8, but since the combined gear and disk 8ª is loose on shaft 7ª, it will be apparent that the gear 10ª and disk 11ª must be fast on the shaft 7ª so that when the lug 9ª shifts the detent 14, the lug 12ª will be moved off of the shoulder 14ᶜ to permit parts 7ª—11ª—10ª to move a half-revolution, and through the change speed gearing y move the gear 15ª a full revolution. In this way the main shaft 16 (C) is given a full turn for each intermittent half turn of the actuating gear.

From the foregoing, it will be apparent that the main shaft C actuates the important elements of the present combination, namely the counters D, E, and G and the variable rate calculating unit F, and further reference will now be made to the various units referred to.

Total units counter

The total units counter D consists of a plurality of type wheels which are driven from the gear 15 through the medium of the intervening gear 17. This counter merely accumulates a total of all of the units registered or used, and is not intended to be reset except in the usual manner of all counters after having reached its counting limit. The total registered by this counter is printed on the bill form H as will be observed from Figure 3 and by keeping the periodic bills, the consumer can always check up on the accuracy of the registration of the meter by subtracting the reading of a subsequent period from the total reading of a former pay period.

Pay period units counter

The shaft 16 also drives the type wheels of the counter E which represents the units of the commodity used within a certain period. That is to say, the shaft 16 carries the gear 18 which registers only the units of the commodity consumed in the period between meter readings. If an electric meter is the device in which the present invention is embodied, the type wheels of the units E will register the kilowatts used and which must be paid for in accordance with the predetermined rate determined by the device F and registered as cash on the type wheels of the unit G. Since the type wheels of the unit E register the units of the commodities used between meter readings, the said type wheels of this unit must be reset after each meter reading. The manner in which they are reset will be fully explained under the description of the resetting mechanism.

Variable rate calculating unit

One of the important functions of the main shaft 16 (C) is to drive the differential rate calculating unit F and to that end the said shaft is provided with a bevel gear 19 meshing with the bevel gear 20 on a worm shaft 21, the latter shaft being disposed at right angles to the main shaft and having thereon a worm 22. This worm drives a gear 23 carried by a shiftable calculating shaft 24, the same being movable axially for resetting purposes as will presently be seen, but held in its normal position by the leaf spring 25 which engages the grooved collar 26. The said shaft 24 carried adjacent the gear 23, a heart-shaped resetting cam 27 and also carries at its end opposite the collar 26 a differential rate calculating cam 28.

The cam 28 is provided, in the instance shown, with two peripheral shoulders 30 and 31 and a normal or initial dwell 32, all of which cooperate with the offset part 33, of a control lever L, having thereon shoulders 34, 35 and 36, to permit of the shifting of the pin 37 of a spring tensioned rate lever 38 resting on each of said shoulders successively. That is to say, the pin 37 of lever 38 is normally poised on the end shoulder 34 to permit of calculations to be made at the initial rate, the dwell 32 of the cam 28 moving in a direction to bring the shoulder 30 into registry with the offset 33 of the lever L. As previously stated, the rate lever 38 is spring tensioned, the spring 38ª effecting that result, and when the shoulder 30 of cam 28 registers with the offset 33, the pin 37 slides along the smooth under surface of lever L until it strikes the second shoulder 35 which permits the rate lever 38 to assume its secondary position to record a second period of charge at a decreased rate. Similarly, when the shoulder 31 registers with offset 33, pin 37 moves to shoulder 36 and a subsequent or third rate is put into effect. Clearly other shoulders could be provided on the lever L to further change the position of the rate controlling lever 38 to obtain further decreased rates of charge.

The rate lever 38 governs the amount of money recorded on the charge printing unit G, by changing the position of a pawl guard which limits the number of teeth adapted to be engaged by an actuating pawl, as the rate of charge decreases. That is to say, the actuating pawl, as will presently appear has a uniform movement or stroke and normally engages a predetermined number of teeth whereby the type dials of the charge printing unit are moved a maximum distance. As the rate decreases, the pawl guard masks or prevents certain of the predetermined number of teeth from being engaged by the pawl, thus causing the printing type wheel to move a lesser distance and thus record a decreased rate. For example, during the initial charge period, the pawl may engage twelve teeth of the ratchet, thus turning the cash drums a specified predetermined distance for the full or first rate. Subsequently the pawl may only engage nine teeth and then later only six teeth to register less cash for the reduced rates.

The mechanism by which the control lever L carries the foregoing into effect may be described as follows:—

The lever 38 is connected by a link 39 with a guard plate 40 pivoted as at 41, concentric with a ratchet gear 42 which in turn meshes with a pinion 43. Check pawls 42$^a$ and 43$^a$ are provided for gears 42 and 43. The pinion 43 is carried by a shaft 44 having thereon a gear 45 which operates the cash unit G. The gear ratio between gear 45 and the gear of the type wheels of unit G is such as to register one unit on the cash dials for each tooth advanced on the ratchet 42 by the pawl 46. Since each revolution of the main shaft 16 (C) represents a commodity unit and each tooth on wheel or gear 42 is a monetary unit, the value of the commodity units in monetary units will be transmitted by shaft 44, and the product shown on the type dials of the unit G. Repeated products by additional rotations of the shaft 16 are, therefore, automatically added on the type dials of unit G. When the position of the guard cam or plate 40 is shifted, the number of teeth on gear 42 engaged by pawl 46 is altered, and accordingly the value of commodity units as recorded is altered, the value decreasing as previously explained.

The gear 42 is, as will be apparent from the foregoing, operated at intervals, or in increments, by the pawl 46 which is pivotally mounted on a bracket or support 47. This support 47 is rotatable about the axis 41 and is operatively connected by the link F$^2$ to the crank 48 carried by the main shaft 16. Thus, the main shaft directly operates the money counter G, the pawl 46 making a uniform stroke for each complete turn or rotation of the shaft 16. After the dials of units E and G have operated over a certain length of time, the next step is to take therefrom a printed record.

Figure 3:
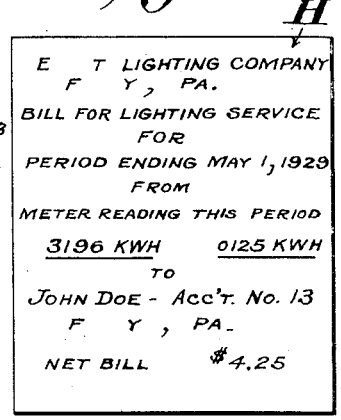
Figure 3 is a form of bill printed by the present invention.

The printed form designated generally as H may be prepared in duplicate by using suitable prepared forms, and one form of bill is shown in Figure 3. Reference will now be made to the manner in which the form H is printed.

Printing

Assuming that it is desired to take a reading or record from the various type counter units D, E and G, the bill form H, or the like, is inserted in the guide 50 (Figures 6 and 10) and then the key K is inserted in the barrel 51 of the lock and the same is moved downwardly to engage the lever 52 which is pivoted as at 53 and tensioned by the spring 54.

The free end of the lever 52 has pivotally connected therewith a member 55 whose lower end 56 is held in contact with lever 57 by a spring 58, and has a shoulder 55$^a$ which normally engages the lever 57. When the lever 52 moves downwardly the member 55 also moves down and shoulder 55$^a$ compels lever 57 to rock on its pivot 58 until the bevelled end 56$^a$ strikes pin 55$^b$. The lever 57 is normally held against pin 57$^a$ by spring 59 so that when shoulder 55$^a$ lets go of lever 57 the end 60 thereof, which is pivotally connected to the vertical rod 70 is given a sharp downward snap. This causes the platens 71 to be thrust against the type wheels of the counters, and also thrust against the fixed type block J which may bear the name and address of the householder or similar data. The plates 71 are carried by the ends of the leaf springs 71$^a$ which are suspended from the lever arms 71$^b$.

When the key K is turned back, the lever 52 goes back against the stop pin 52$^a$, and the printing is finished so that the bill form H can be withdrawn from the guide slot 50.

The key K may then be turned in the other or opposite direction to reset the type wheel counters E and G, and also reset the differential rate calculating device F to again record the initial or maximum rate and thereafter record further reduced rates.

Resetting

When the key K is manipulated as above indicated, the offset portion of the barrel strikes the lever 72 which is normally held against the pin 72ª by spring 54, and lifts the same thus also lifting the link 73 and turning crank 74 upwardly. This crank 74 is carried by a resetting shaft 75 having thereon a cam 76 (Figure 7). When the cam 76 is turned in the direction of the arrow, it causes, through interlocking cams 77 and 78, the upper and lower groups of resetting arms 79 and 80 respectively to cooperate with the lugs z on the resetting wheels 81 and 82 to move said type wheels back to zero.

In order to permit the resetting wheels to bring the type disks of the units E and G back to the proper point, the transfer pinions 83 and 84 must be elevated simultaneously with the movement of the resetting arms, and, to that end the shaft 75 carries therewith a cam 85 which operates lever 86. This lever 86 is fast on shaft 87 and has lever arms 88 and 89 which left the pinions 83 and the gear 45. The said shaft 87 also has thereon the rearwardly extending arm 90 which is pivotally connected with link 91, and this link in turn operates the lever 92 which is pivoted coaxially with the resetting wheels 82 and controls the transfer pinions 84.

The calculating unit F is reset by a cam 93 also on shaft 75, the said cam operating a lever 94 which is pivoted at 95 (Figure 8) and has its lower end 96 arranged to engage the leaf spring 25. This spring, it will be remembered normally holds the calculating shaft 24 in operative position. When the lever 94 presses the spring 25 and shaft 24 inwardly it disengages the gear 23 from the worm 22 and also moves calculating cam 28 clear of the lever L. Thus, the shaft 24 and cam 28 are free to go back to their normal position as determined by the valley of the heart cam 27. That is to say, when the shaft 24 is free for resetting, the lower end 97 of lever 98 is pressed against the periphery of the cam 27 thereby causing the same to rotate until the end 97 rests in the valley of the heart. To insure the proper pressure on the lever 98 to actuate the heart-shaped cam, the end of the lever which is pivoted on the shaft 99 is engaged by one end of a coil spring 100 while the other end of the spring is engaged by a gear 101. This latter gear is also loosely mounted on the shaft 99 and is operated or actuated by gear 102 on the shaft 75. As shaft 75 and gear 102 turn, the spring 100 is put under tension, and such tension is communicated to the lever arm 98 whereby the shaft 24 is properly reset. Also in its movement, lever 98 contacts with lever 103 which is affixed to shaft 99 by which lever 38 is returned to its initial position.

The meter attendant may then turn the key back to normal position and permit arms 72 (Figure 10) to again rest on the stop lock 72ª. The meter is then ready for the next registration period.

Figure 12 of the drawings illustrates a modified form of actuator $A^2$ which illustrates the range of application of the invention to other uses. For example, the ratchet $1^a$ may be operated by a spring tensioned pawl $B^{21}$ which is operated by a flexible operating connection $B^{22}$ associated with a railway rail $B^{23}$. As the wheels of a train pass over the free end of the cable $B^{22}$ the ratchet $1^a$ will be actuated and if the ratchet is associated with a device of the type shown at F and G in Figure 1, together with the intervening operating instrumentalities, suitable records may be obtained in a manner which will be readily apparent.

Without further description it is thought that the features and advantages of the invention will be readily apparent to those skilled in the art, and it will of course be understood that changes in the form, proportion and minor details of construction may be resorted to, without departing from the spirit of the invention and the scope of the appended claims.

I claim :—

1. A variable rate recording meter including in combination, a type wheel counter device, actuating means, and means operated by said actuating means for modifying the operation of said type wheel counter device in accordance with predetermined rates.

2. A variable rate recording meter including in combination a charge printing unit including a plurality of type wheels, actuating means, pawl and ratchet means controlled by said actuating means for operating said charge printing unit, and means for modifying the operation of said pawl and ratchet means for controlling the charge printing unit in accordance with predetermined rates.

3. A variable rate recording meter including in combination a charge printing unit, a ratchet device operatively connected with said charge printing unit, a pawl for said ratchet having a uniform stroke, and means for automatically rendering inoperative certain of the teeth of the ratchet normally engaged by the pawl to modify the operation of the charge printing unit in accordance with preselected rates.

4. A variable rate recording meter including in combination, a charge printing unit, a ratchet operatively connected with said charge printing unit, a pawl having a uniform operating stroke and normally engaging a preselected number of teeth in the ratchet, and means for automatically shielding a selected number of said teeth from engagement by the pawl during its stroke to modify the operation of the ratchet and the charge printing unit in accordance with predetermined decreasing rates.

5. A variable rate recording meter including in combination, a charge printing unit, a ratchet operatively connected with said unit, a pawl operating in conjunction with said means for imparting a uniform stroke to said pawl whereby the same will be initially engaged a predetermined number of teeth on the ratchet to operate the charge printing unit in accordance with a predetermined initial rate, and means for automatically rendering said pawl inoperative with respect to a certain predetermined movement of said ratchet teeth to modify the operation of the charge printing unit in accordance with a predetermined decreased rate of charge.

6. A variable rate recording meter including in combination, a charge printing device, a ratchet operatively connected with said charge printing device, actuating means, a pawl adapted to engage with a predetermined number of teeth on said ratchet, means for operating said pawl from said actuating means, and an automatic rate changing device for modifying the operation of the charge printing unit, said rate changing device including a guard plate for rendering certain of the teeth of the ratchet within the stroke of the pawl inoperative during a portion of the stroke of the pawl after a predetermined period.

7. A variable rate recording meter including in combination, a charge printing device, a ratchet operatively connected with said charge printing device, actuating means, a pawl adapted to engage with a predetermined number of teeth on said ratchet, means for operatively connecting said pawl with the actuating means, and an automatic rate changing device for modifying the operation of the charge printing unit, said rate changing device including a guard plate for rendering certain teeth of the ratchet within the stroke of the pawl inoperative, and means connected with said actuating means for automatically changing the position of the guard plate at spaced intervals to modify the operation of the charge printing device.

8. A variable rate recording meter including in combination, a charge printing device, a ratchet operatively connected with the charge printing device, a pawl for said ratchet, actuating means, an operative connection between said actuating means and said pawl, a member for modifying the operative engagement between the pawl and the ratchet, a rate controlling lever operatively connected with said member, and means operatively connected with said actuating means for shifting the position of said rate controlling lever to control the operative engagement between said pawl and said ratchet to modify the operation of the charge printing device.

9. A variable rate recording meter including a charge printing device, actuating means, and means interposed between said actuating means and the charge printing device for modifying the operation of the latter in accordance with preselected rates, said means including a pawl and ratchet device, means for controlling the movement imparted to the ratchet by the pawl in said pawl and ratchet device, a rate controlling lever operatively connected with said last named means, a lever having a plurality of shoulders for governing the position of the rate controlling lever, and means operatively connected with said actuating means for controlling the position of the lever having the shoulders.

10. A variable rate calculating device including recording dials, a ratchet operatively connected with said dials, actuating means, a pawl operatively connected with said actuating means, a guard shiftable with respect to the teeth of the ratchet adapted to be engaged by the pawl, a rate controlling lever operatively connected with said guard, a lever having a plurality of rate controlling positions operatively connected with the lever, a cam for controlling the position of said lever, and means operatively connecting said cam with the actuating means.

11. A variable rate calculating device including a recording unit, a ratchet operatively connected with said recording unit, a main shaft, a pawl adapted to engage with said ratchet, an operative connection between said main shaft and the pawl, a guard for making preselected groups of ratchet teeth traversed by said pawl, and means operatively connected with said main shaft for automatically shifting said guard.

In testimony whereof he hereunto affixes his signature.

DOUGLAS KINDER McILVAINE.